(12) United States Patent
Gezici et al.

(10) Patent No.: US 7,327,314 B2
(45) Date of Patent: Feb. 5, 2008

(54) TWO-WAY RANGING BETWEEN RADIO TRANSCEIVERS

(75) Inventors: Sinan Gezici, Princeton, NJ (US); Zafer Sahinoglu, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 626 days.

(21) Appl. No.: 10/970,642

(22) Filed: Oct. 20, 2004

(65) Prior Publication Data

US 2006/0083340 A1 Apr. 20, 2006

(51) Int. Cl.
   *G01S 3/02* (2006.01)
(52) U.S. Cl. ........................ 342/458; 342/450
(58) Field of Classification Search .............. 342/458, 342/450
   See application file for complete search history.

(56) References Cited

U.S. PATENT DOCUMENTS

| | | | | |
|---|---|---|---|---|
| 5,589,821 A | * | 12/1996 | Sallen et al. | 340/573.4 |
| 5,602,535 A | * | 2/1997 | Boyles et al. | 340/5.22 |
| 5,892,765 A | * | 4/1999 | Shapard et al. | 370/401 |
| 6,744,364 B2 | * | 6/2004 | Wathen | 340/539.1 |
| 6,894,644 B2 | * | 5/2005 | Duffett-Smith et al. | 342/387 |
| 7,123,924 B2 | * | 10/2006 | Cuffaro | 455/456.1 |
| 2002/0149518 A1 | * | 10/2002 | Haataja et al. | 342/458 |

OTHER PUBLICATIONS

A. Bletsas, V. Bhalodia, M. Mihalakis and I. Mirkin, "Network Beatles: A Distributed Wireless Network Platform for Tangible User Interfaces", Media & Networks Group, MIT Media Lab. 2002.*
Joon-Yong Lee and Robert A. Scholtz, "*Ranging in a Dense Multipath Environment Using an UWB Radio Link*," IEEE Journal on Selected Areas in Communications, vol. 20, No. 9, Dec. 2002.

* cited by examiner

*Primary Examiner*—David C. Payne
*Assistant Examiner*—Nader Bolourchi
(74) *Attorney, Agent, or Firm*—Dirk Brinkman; Clifton D. Mueller; Gene V. Vinokur

(57) ABSTRACT

A method estimates a distance between transceivers in a wireless communications network. A first time interval T is set in a transmitter and a receiver. A signal is transmitted from the transmitter to the receiver at a time $t_2$ according to a first clock of the transmitter. The signal is received in the receiver at a time $t_3$. Processing delays of the receivers are determined. A reply to the signal is sent from the receiver to the transmitter at a time $t_6$ such that $|t_3-t_6|=T$. The reply is received in the transmitter at a time $t_7$ of the first clock and a distance d between the transmitter and the receiver is determined according to $d=c(|t_2-t_7|-T)/2$, where c is the speed of light.

2 Claims, 2 Drawing Sheets

TWO-WAY RANGING BETWEEN RADIO TRANSCEIVERS

FIELD OF THE INVENTION

The present invention relates generally to radio communication systems, and more particularly to determining distances between transceivers.

BACKGROUND OF THE INVENTION

To estimate a distance between a transmitter and a receiver in a wireless communications network, the transmitter can send a signal to the receiver at $t_1$. The receiver, as soon as possible, returns a reply signal to the transmitter. The transmitter measures the time of arrival (TOA) of the reply signal at time $t_2$. An estimate of the distance between the transmitter and the receiver is the time for the signal to make the round trip divided by two and multiplying by the speed of light, i.e.:

$$D = \frac{|t_1 - t_2|}{2} c.$$

This simple method ignores possible delays at the transmitter and the receiver. Therefore, the estimated distance is too large.

FIG. 1 shows a better method for estimating the distance, see W. C. Lindsey and M. K. Simon, "*Phase and Doppler Measurements in Two-Way Phase-Coherent Tracking Systems*," New York, Dover, 1991.

The times of the transmitter and receiver clocks are $t_1$ and $t_2$, respectively. The transmitter sends the signal 101 to the receiver at time $t_1=0$. The receiver sets its clock to $t_2=0$ at a coarse estimation of the arrival time of the signal, which corresponds to a time $t_1=t_{prop}$ at the transmitter, which is the propagation delay. However, the estimation of the arrival time is different from the true arrival time by a time offset $t_{off,2}$, which is because of the errors in the estimation algorithm and the processing time.

The receiver returns a reply signal 102 to the transmitter after an elapsed time interval T known to both the receiver and the transmitter, this corresponds to a time $t_2=T$ at the receiver, and a time $t_1=t_{prop}+t_{off,2}+T$ at the transmitter. The interval T is made large with respect to the processing time, $t_{off,2} \ll T$.

The transmitter receives the reply signal at a time $t_1=2t_{prop}+t_{off,2}+T$. The time taken to process reply signal is $t_{off,1}$. This time is measured at the transmitter. The round trip time is $t_1=t_{round}$, from which the distance can be estimated, assuming that the processing delays, $t_{off,1}$ and $t_{off,2}$, are known at the transmitter.

There are problems with the method described above. The transmitter can possibly estimate its own processing delays, but not the processing delays at the receiver. The only way these can become known to the transmitter is by conveying this information to the transmitter. This increases the complexity of the system and overhead. Furthermore, that method also assumes that the transmitter and receiver clocks run at the same rate, i.e., there is no clock drift, which is unlikely in cheap clocks used in low cost transceivers. If there is drift, then the time interval T elapsed at the receiver will be different from the same interval as measured at the transmitter.

Therefore, it is desired to improve the accuracy of two-way ranging.

SUMMARY OF THE INVENTION

The invention provides a method for estimating a distance between transceivers in a wireless communications network. A first time interval T is set in a transmitter and a receiver. A signal is transmitted from the transmitter to the receiver at a time $t_2$ according to a first clock of the transmitter. The signal is received in the receiver at a time $t_3$. Processing delays of the receivers are determined. A reply to the signal is sent from the receiver to the transmitter at a time $t_6$ such that $|t_3-t_6|=T$. The reply is received in the transmitter at a time $t_7$ of the first clock and a distance d between the transmitter and the receiver is determined according to $d=c(|t_2-t_7|-T)/2$, where c is the speed of light.

DETAILED DESCRIPTION OF THE PREFERRED EMBODIMENT

Our invention provides two-way ranging for estimating a distance between two radio transceivers in a wireless communications network. For the purpose of this description, a first transceiver that determines the distance is called the transmitter, and a second transceiver that participates in the distance estimate is called the receiver. However, it should be understood that both devices can transmit and receive for the operation of the invention, which uses two-way ranging.

In contrast with the prior art, we do not transmit additional information to correct for processing delays. We can also estimate drift rates between clocks of the transceivers.

Figure 1:
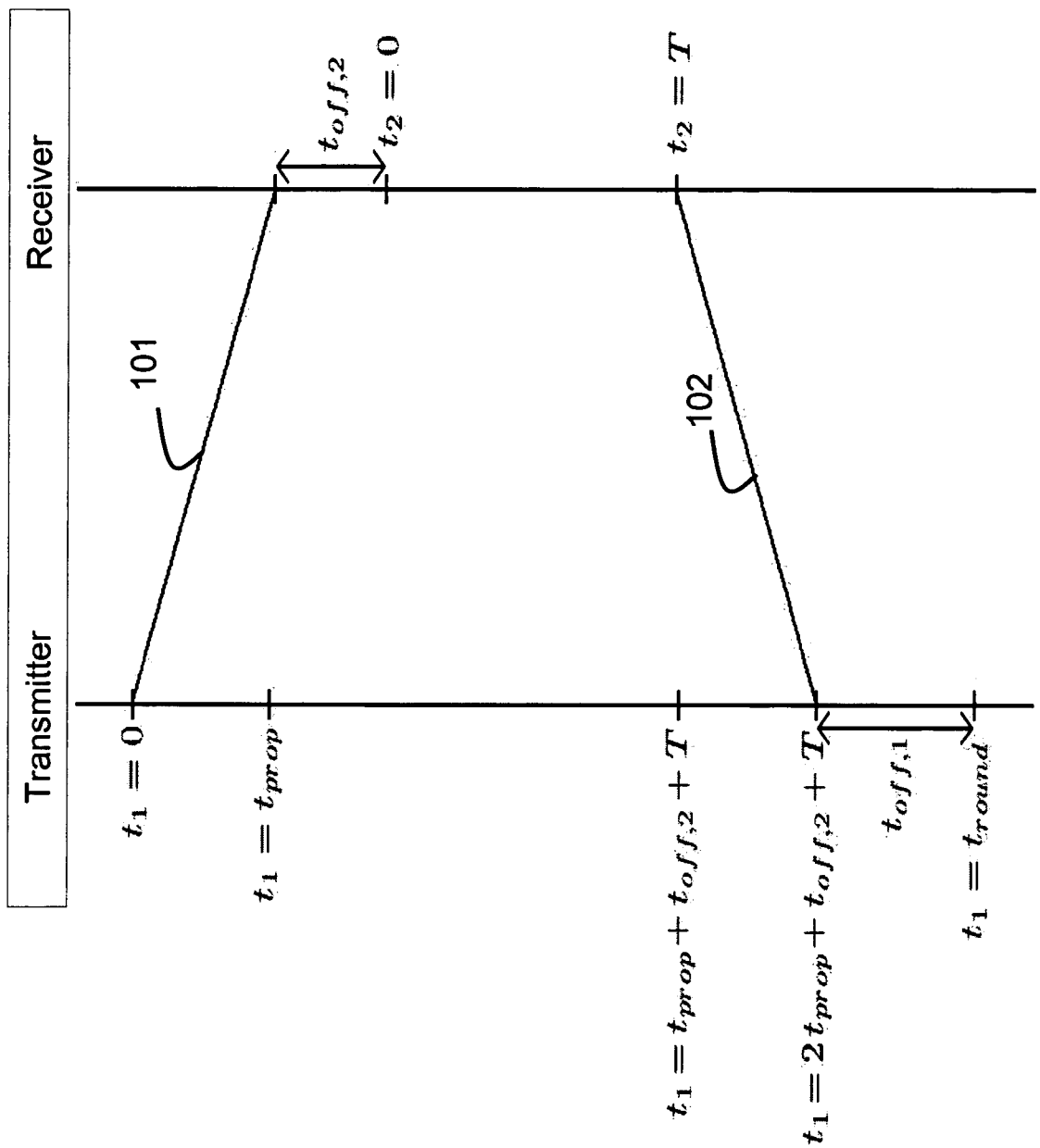
FIG. 1 is a timing diagram of a prior art two-way ranging method.
Figure 2:
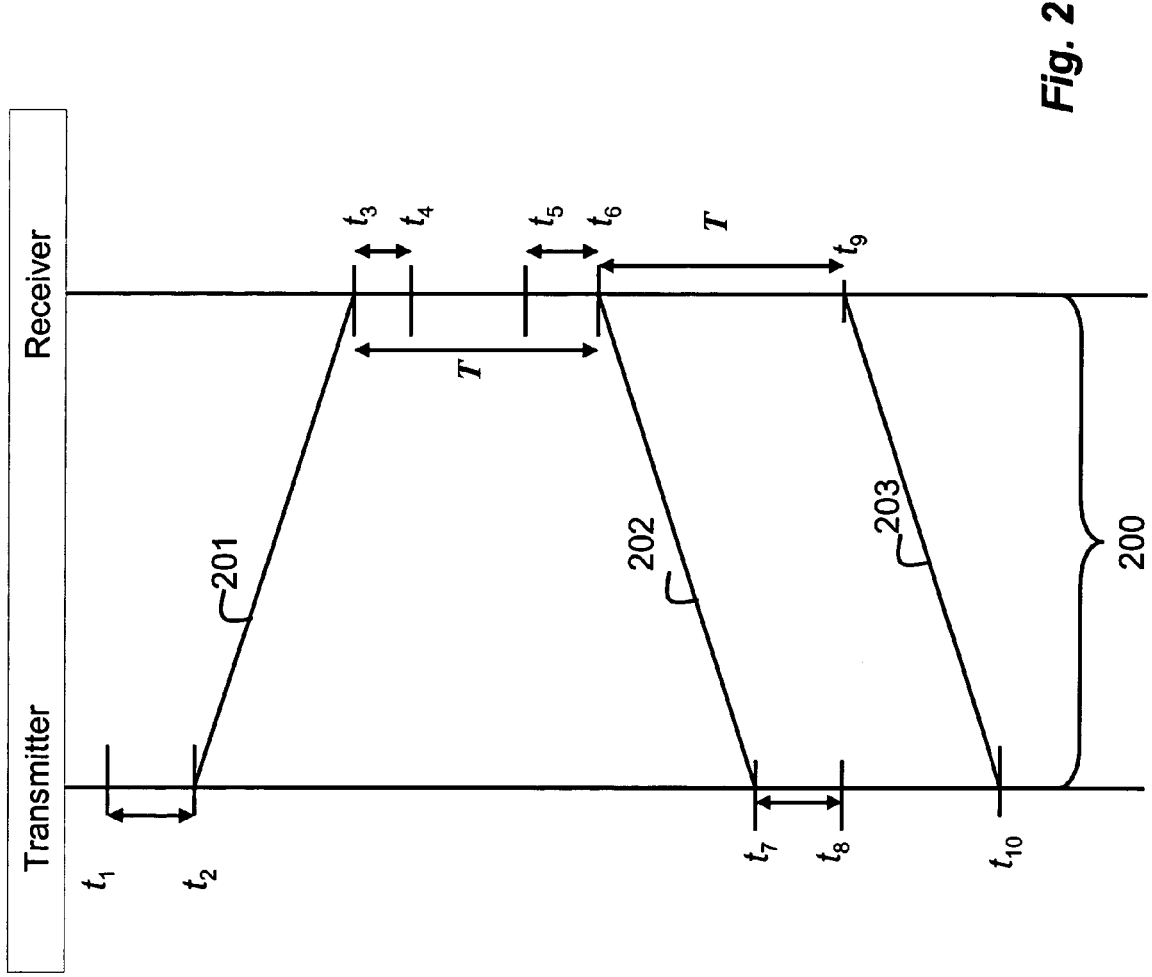
FIG. 2 is a timing diagram of a two-way ranging method according to the invention.

As shown in FIG. 2, $t_1$, $t_2$, $t_7$, $t_8$, and $t_{10}$ denote times according to local clock at the transmitter, and $t_3$, $t_4$, $t_5$, $t_6$, and $t_9$ denote times at the receiver.

At time $t_1$, the transmitter prepares to transmit a signal 201 to the receiver. The signal enters the channel 200 at time $t_2$, due to a processing delay $|t_1-t_2|$, which can be measured accurately by the transmitter.

The signal is received at the receive antenna at a time $t_3$.

In response to receiving the signal 201, the receiver starts processing at time $t_4$ due to the processing delay $|t_3-t_4|$, and prepares to send a reply 202 at time $t_5$. The reply enters the channel at time $t_6$, due to a processing delay $|t_5-t_6|$. The receiver can also measure its internal processing delays.

The interval time T is known at both the transmitter and the receiver.

Therefore, the receiver makes sure that the time $T=|t_3-t_6|$.

The reply is received by the transmitter at time $t_7$, and begins processing at time $t_8$, due to a delay $|t_7-t_8|$, also known.

Then, the distance $d=c(|t_2-t_7|-T)/2$, where c is the speed of light.

In contrast to the prior art, our method considers all processing delays at the transmitter and the receiver. As an advantage, the transmitter does not need to know the receiver's processing delays, because the receiver returns the signal at time $t_6$, which incorporates the known interval T compensated for the processing delays.

In addition, clock drift can be determined as follows. The receiver returns a second reply 203 at a time $t_9$, which is received at time $t_{10}$. Any difference in time between the expected arrival time and the actual arrival time of the second reply 203 at the transmitter is a measure of drift between the clocks of the transmitter and the receiver. If the transmitter's clock is more accurate than the receiver's clock, correcting for the drift of the receiver's clock improves the accuracy of the distance estimate.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for estimating a distance between transceivers in a wireless communications network, comprising:

setting a first time interval T in a transmitter and a receiver;

transmitting from the transmitter to the receiver a signal at a time $t_2$ according to a first clock of the transmitter;

receiving the signal in the receiver at a time $t_3$;

determining processing delays of the receivers;

sending a reply to the signal from the receiver to the transmitter at a time $t_6$ such that $|t_3-t_6|=T$;

receiving the reply in the transmitter at a time $t_7$ of the first clock; and determining a distance d between the transmitter and the receiver according to $d=c(|t_2-t_7|-T)/2$, where c is the speed of light.

2. The method of claim 1, further comprising:

sending another reply from the receiver;

determining a drift between the first clock and the second clock from the reply and the other reply.

* * * * *